United States Patent
Mahnad (10) Patent No.: US 10,035,285 B2
(45) Date of Patent: Jul. 31, 2018

(54) OPTICAL TAPE EMBOSSER DRUM WITH SHIM IDENTIFICATION

(71) Applicant: ORACLE INTERNATIONAL CORPORATION, Redwood City, CA (US)

(72) Inventor: Faramarz Mahnad, Brookline, MA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 65 days.

(21) Appl. No.: 15/233,041

(22) Filed: Aug. 10, 2016

(65) Prior Publication Data

US 2016/0346961 A1    Dec. 1, 2016

Related U.S. Application Data

(62) Division of application No. 14/329,105, filed on Jul. 11, 2014, now Pat. No. 9,434,102.

(51) Int. Cl.
  *B29C 33/38* (2006.01)
  *B29C 59/04* (2006.01)
  (Continued)

(52) U.S. Cl.
  CPC ........ *B29C 33/3878* (2013.01); *B29C 33/424* (2013.01); *B29C 43/46* (2013.01); *B29C 59/04* (2013.01); *B29C 59/046* (2013.01); *B29D 17/005* (2013.01); *B44B 5/0009* (2013.01); *C25D 7/00* (2013.01); *G11B 7/263* (2013.01);
  (Continued)

(58) Field of Classification Search
  CPC ... B29C 59/04; B29C 43/46; B29C 2043/461; B29C 2043/463; B29C 2059/023; B29C 2059/022; B29C 33/424; B29C 2033/426; B29C 33/3878; B29C 33/302; B29C 33/3892; B29C 33/3857; B29C 59/046; B44B 5/0009; B44B 5/026; B31F 2201/0748; B31F 2201/073; Y10S 425/03; C25C 7/00; B29D 17/005; B29L 2905/08;
  (Continued)

(56) References Cited

U.S. PATENT DOCUMENTS 3,541,216 A * 11/1970 Rochlis ................. B29C 43/222
                                                        264/284
4,116,594 A *  9/1978 Leanna .................... B41C 1/18
                                                        264/284

(Continued)

OTHER PUBLICATIONS

PCT International Search Report and Written Opinion of the International Searching Authority Dated Oct. 8, 2015, Application No. PCT/US2015/039880, Applicant Oracle International Corporation, 10 Pages.

*Primary Examiner* — Alison L Hindenlang
*Assistant Examiner* — Jerzi H Moreno Hernandez
(74) *Attorney, Agent, or Firm* — Invoke (57) ABSTRACT

A method is provided for making an embossing drum that is useable to emboss tape media. The method includes assembling together multiple stamper plates that each have embossing features for embossing tape media, and the stamper plates include at least one first plate and at least one second plate. Furthermore, the embossing features of each first plate are inverted with respect to the embossing features of each second plate.

20 Claims, 6 Drawing Sheets

(51) Int. Cl.
  *B29D 17/00* (2006.01)
  *G11B 7/26* (2006.01)
  *B44B 5/00* (2006.01)
  *B29C 43/46* (2006.01)
  *C25D 7/00* (2006.01)
  *B29C 33/42* (2006.01)
  *G11B 7/24009* (2013.01)

(52) U.S. Cl.
  CPC .... *B29C 2043/463* (2013.01); *B29K 2905/08* (2013.01); *G11B 7/24009* (2013.01)

(58) Field of Classification Search
  CPC ...... G11B 7/263; G11B 7/24009; C25D 7/00; B29K 2905/08
  See application file for complete search history.

(56) References Cited

U.S. PATENT DOCUMENTS

| | | |
|---|---|---|
| 4,668,984 A | 5/1987 | Rosenfeld |
| 5,345,659 A | 9/1994 | Allan |
| 6,354,827 B1 | 3/2002 | Kerfeld |
| 8,174,950 B2 | 5/2012 | Ritter et al. |
| 8,465,823 B1 | 6/2013 | Kim |
| 8,616,870 B2 | 12/2013 | Mahnad |
| 9,434,102 B2 | 9/2016 | Mahnad |
| 2002/0197346 A1* | 12/2002 | Papadopoulos ........... B31F 1/07 425/194 |
| 2005/0064057 A1* | 3/2005 | Morita .................... B82Y 10/00 425/192 R |
| 2005/0082700 A1 | 4/2005 | Deeman et al. |
| 2005/0170050 A1* | 8/2005 | Murray ................ A23G 3/0236 426/76 |
| 2008/0106001 A1 | 5/2008 | Slafer |
| 2008/0131548 A1 | 6/2008 | Gauzner et al. |
| 2011/0051249 A1 | 3/2011 | Endoh et al. |
| 2011/0141868 A1 | 6/2011 | Mahnad |
| 2013/0019766 A1 | 1/2013 | Mahnad et al. |
| 2013/0106012 A1 | 5/2013 | Matthews |
| 2013/0106015 A1 | 5/2013 | Mahnad et al. |

\* cited by examiner

OPTICAL TAPE EMBOSSER DRUM WITH SHIM IDENTIFICATION

CROSS-REFERENCE TO RELATED APPLICATIONS

This application is a divisional of U.S. application Ser. No. 14/329,105 filed Jul. 11, 2014, the disclosure of which is hereby incorporated in its entirety by reference herein.

TECHNICAL FIELD

The disclosure relates to an embosser drum for tape media, and to methods of making an embosser drum and components thereof.

BACKGROUND

Figure 1:
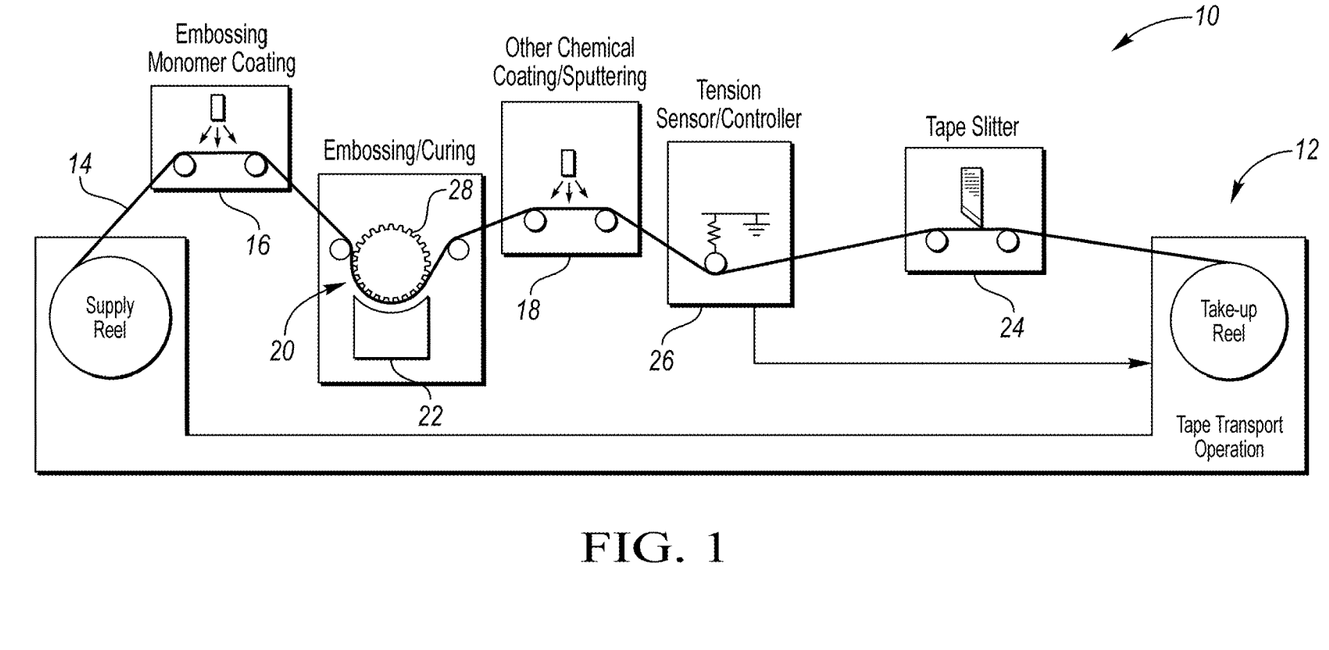
FIG. 1 is a schematic view of a roll-to-roll nano-imprint lithography system including an embossing drum for imprinting optical tape media.

Roll-to-roll nano-imprinting lithography systems, such as platform 10 shown in FIG. 1, have been proposed as an efficient and effective means of pre-formatting optical tape media with imprint of nanometer dimensional structure (nano-structure features or patterns) such as wobbled edge groove track patterns (referred to as "wobble patterns"). These systems typically involve several operational stages, such as shown with platform 10 of FIG. 1. The platform 10 also includes a tape transport system 12 for moving an optical tape media 14 through the different stages, which may include coating and sputtering stages 16, 18 for coating the media 14 with an appropriate embossing monomer and other chemicals, an embossing stage 20 for imprinting the desired pattern on the media 14, a curing stage 22 for curing the embossed media 14 and a slitting stage 24 for cutting the media 14. The platform shown in FIG. 1 also includes a tension sensor 26 that is in communication with the transport system 12 to provide information regarding the tension of the media 14.

The function of the embossing stage 20 is to imprint the nano-structure patterns into the media 14 using an embossing drum 28 that has the patterns formed in its hard surface. By the process of pressing the drum 28 into the monomer coating on the media 14 and subsequent curing of the monomer material, the patterns may be imprinted into the media 14 with nano-dimensional accuracy and fidelity.

Figure 2:
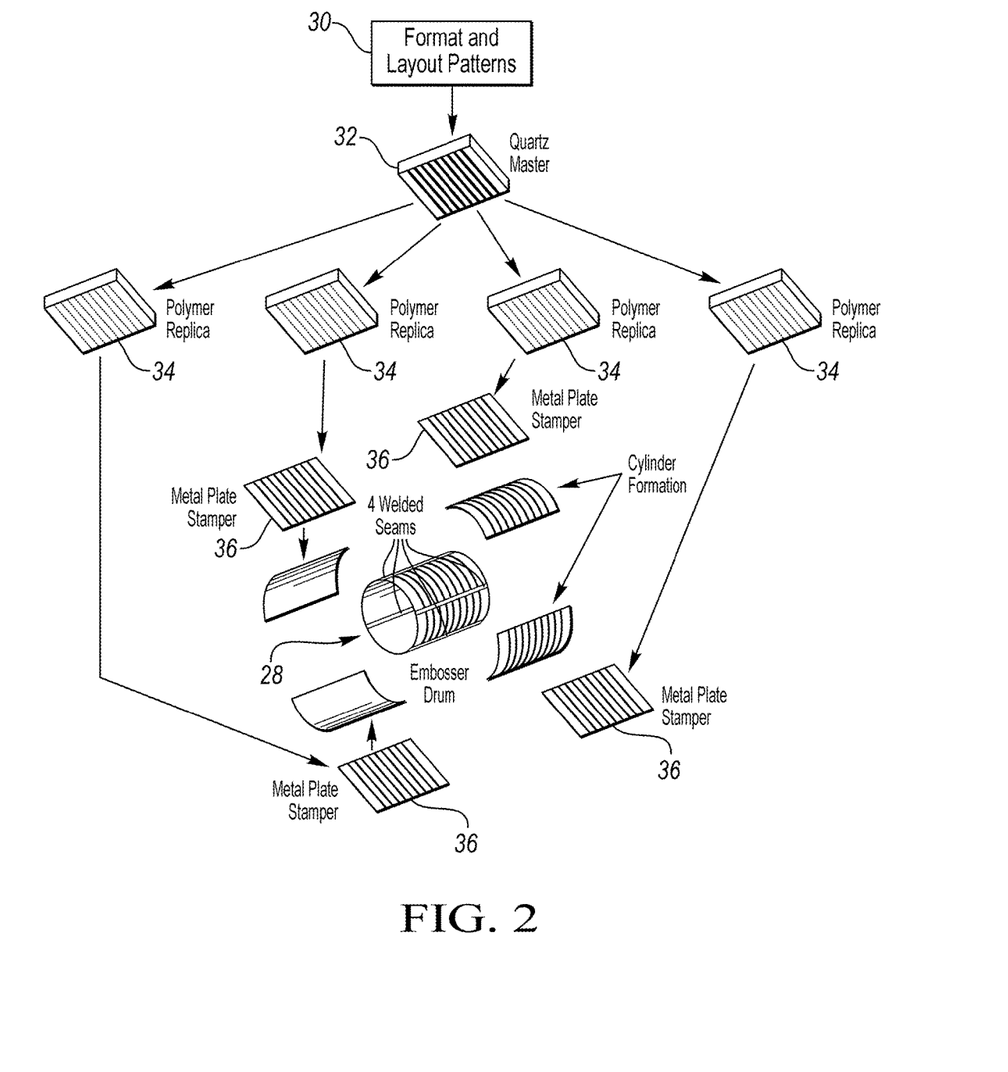
FIG. 2 is a schematic view showing details of a manufacturing process for making the embossing drum shown in FIG. 1.

The development of the embossing drum 28 will now be discussed with reference to FIG. 2. The development process starts first with the design of nano-structure features or patterns and their layout, as shown in box 30, followed by formation of a quartz or silicon "master" 32 that is etched with the nano-structure patterns. Identical inverse replicas of the patterns of the master 32 are then made by producing multiple rigid polymer-material replicas 34 of the master 32. Next, thin metal shims or stamper plates 36 with the nano-structure patterns are formed by electroplating surfaces of the replicas 34. The thin metal plates 36 are then processed and formed to make segments of the embossing drum 28. The segments are welded together at seams to create the final embossing drum 28 such that the embossing drum 28 contains four identical stampers plates 36.

SUMMARY

According to one aspect of the present disclosure, a method of making stamper plates for an embossing drum that is useable to emboss tape media is provided. The method includes forming one or more first stamper plates using a master template, and forming a second stamper plate from one of the one or more first stamper plates such that the second stamper plate and the one first stamper plate have inverse land and groove patterns. Furthermore, the second stamper plate and the one first stamper plate or another of the one or more first stamper plates are useable on the drum to emboss tape media.

According to another aspect of the present disclosure, a method of making an embossing drum that is useable to emboss tape media is provided. The method includes assembling together multiple stamper plates that each have embossing features for embossing tape media, and the stamper plates include at least one first plate and at least one second plate. Furthermore, the embossing features of each first plate are inverted with respect to the embossing features of each second plate.

According to yet another aspect of the present disclosure, an embossing drum for embossing tape media is provided. The embossing drum includes a first stamper plate for embossing the tape media, and a second stamper plate positioned proximate the first stamper plate for embossing the tape media, wherein the stamper plates have inverse land and groove patterns.

While exemplary embodiments are illustrated and disclosed, such disclosure should not be construed to limit the claims. It is anticipated that various modifications and alternative designs may be made without departing from the scope of the invention.

DETAILED DESCRIPTION

Embodiments of the present disclosure are described herein. It is to be understood, however, that the disclosed embodiments are merely examples and that other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 3:
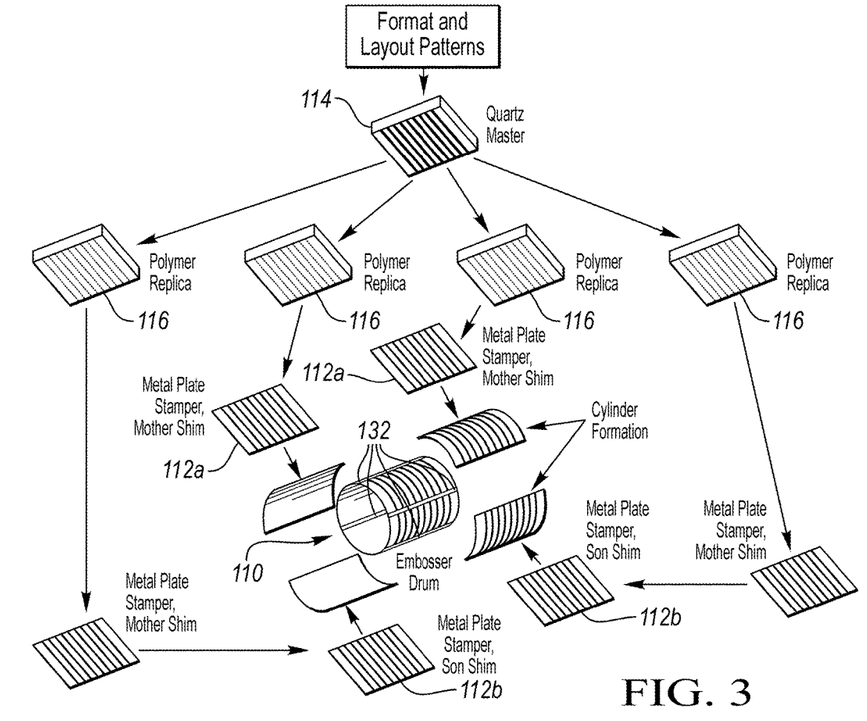
FIG. 3 is a schematic view showing details of a manufacturing process for making an embossing drum according to the present disclosure.

FIG. 3 shows an embosser or embossing drum 110, according to the present disclosure, which may be used to emboss optical tape media. For example, the embossing drum 110 may be used in the system or platform 10 shown in FIG. 1 in place of the embossing drum 28 to emboss the media 14. The embossing drum 110, however, provides an innovative way to identify shims or stamper plates 112 used to make the drum 110.

The embossing drum 110 may include one or more first stamper plates 112a for embossing the tape media, and one or more second stamper plates 112b positioned proximate the one or more first stamper plates 112a for also embossing the tape media. In the embodiment shown in FIG. 3, the embossing drum 110 includes two first stamper plates 112a and two second stamper plates 112b that have nanometer dimensional structure (nano-structure features or patterns) formed thereon, such that the stamper plates 112a and 112b can be distinguished from each other as explained below in further detail. The nano-structure features may include embossing features 113, such as land and groove patterns that define wobbled edge groove track patterns, which may be referred to as "wobble patterns."

Figure 4:
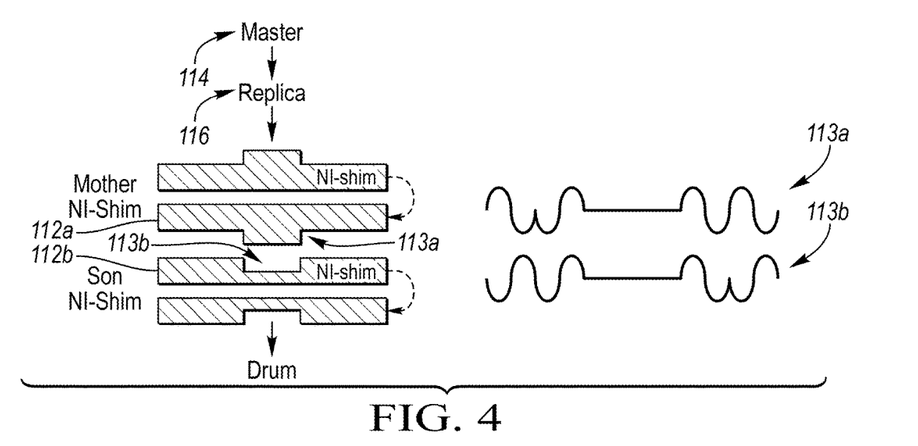
FIG. 4 is a schematic view showing additional details of the manufacturing process for making the embossing drum of FIG. 3.

Each first plate 112a may be formed using a single master template 114, such as a quartz or silicon master. For example, one or more replicas 116, such as polymer replicas, may be formed from the master template 114, and each first stamper plate 112a may be formed from one of the replicas 116 such as by electroplating nickel or other suitable material onto one of the replicas 116, and then removing the thus formed first stamper plate 112a from the replica 116. As another example, each first stamper plate 112a may be formed from the same replica 116. Furthermore, referring to FIGS. 3 and 4, the second stamper plates 112b may each be formed from one of the first stamper plates 112a that is used with the drum 110, or each second stamper plate 112b may be formed from another first stamper plate 112a made from one of the replicas 116, or both second stamper plates 112b may be formed from the same first stamper plate 112a (either a first stamper plate 112a that is used with the drum 110 or another first stamper plate 112a). For example, each second stamper plate 112b may be formed by electroplating nickel or other suitable material onto a first stamper plate 112a, and then removing the thus formed second stamper plate 112b from the first stamper plate 112a. Because each second stamper plate 112b is made from a first stamper plate 112a, the first stamper plates 112a may be referred to as "mother" plates or shims, and the second stamper plates 112b may be referred to as "son" plates or shims.

With the above manufacturing process, all of the stamper plates 112a, 112b may be formed using a single master template 114. Furthermore, since each second stamper plate 112b is formed from a first stamper plate 112a, the embossing features of each second plate 112b are inverted with respect to the embossing features of each first plate 112a. For example, each land 113a on a first stamper plate 112a corresponds to a groove 113b formed on a second stamper plate 112b, and each groove on a first stamper plate 112a corresponds to a land formed on a second stamper plate 112b. In addition, the embossing features 113b of each second plate 112b may also be vertically mirrored (e.g., longitudinally mirrored in a direction of tape media travel) with respect to the embossing features 113a of each first plate 112a, as shown schematically in FIG. 4.

Figure 5:
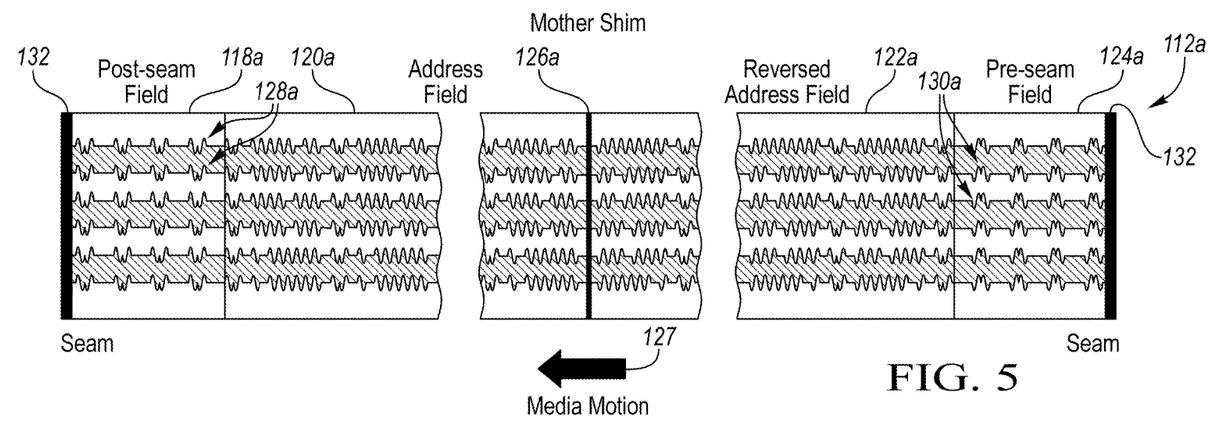
FIG. 5 is a plan view of a first stamper shim or plate of the embossing drum of FIG. 3.

Referring to FIG. 5, an exemplary first stamper plate 112a is shown in more detail. In the illustrated embodiment, the first stamper plate 112a is divided into first, second, third and fourth sections 118a, 120a, 122a and 124a, respectively. The first section 118a may be a post-seam field or section (e.g., a section to be located after a seam by or at which the first stamper plate 112a is connected to another stamper plate), the fourth section may be a pre-seam field or section (e.g., a section to be located prior to a seam by or at which the first stamper plate 112a is connected to another stamper plate), and the second and third sections 120a and 122a may be located between the first and fourth sections 118a and 124a and on opposite sides of a centerline 126a of the first stamper plate 112a. Furthermore, the second section 120a may be referred to as an address field, and the third section 122a may be referred to as a reversed address field. A corresponding direction of travel 127 for tape media to be imprinted by the first stamper plate 112a is also shown in FIG. 5.

In the embodiment shown in FIG. 5, the first and fourth sections 118a and 124a are horizontally mirrored (e.g., laterally mirrored) with respect to each other. Furthermore, the first section 118a has groove patterns with identically wobbled edges 128a, for example, and the fourth section 124a has land patterns with identically wobbled edges 130a.

Figure 6:
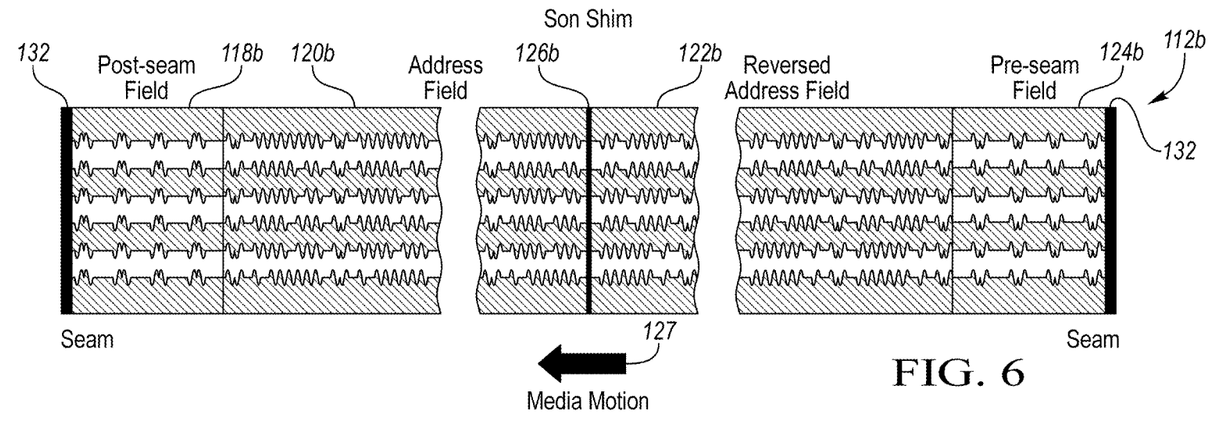
FIG. 6 is a plan view of a second stamper shim or plate of the embossing drum of FIG. 3.

Referring to FIG. 6, an exemplary second stamper plate 112b is shown in more detail. As mentioned above, because the second stamper plate 112b is formed from a first stamper plate 112a, the first and second stamper plates 112a and 112b have inverse land and groove patterns. For example, land patterns in the first stamper plate 112a become or correspond to groove patterns in the second stamper plate 112b, and groove patterns in the first stamper plate 112a become or correspond to land patterns in the second stamper plate 112b.

Furthermore, the second stamper plate 112b is divided into first, second, third and fourth sections 118b, 120b, 122b and 124b, respectively, and the second stamper plate 112b is vertically mirrored with respect to the first stamper plate 112a. Therefore, the first, second, third and fourth sections 118b, 120b, 122b and 124b, respectively, of the second stamper plate 112b are respectively related or correspond to the fourth, third, second and first sections 124a, 122a, 120a and 118a, respectively, of the first stamper plate 112a. In addition, in the embodiment shown in FIGS. 5 and 6, the first section 118b of the second stamper plate 112b is a horizontal mirror replica of the first section 118a of the first stamper plate 112a, and the fourth section 124b of the second stamper plate 112b is a horizontal mirror replica of the fourth section 124a of the first stamper plate 112a.

The stamper plates 112a and 112b may be assembled together in any suitable manner to form the drum 110. For example, referring to FIG. 3, the stamper plates 112a and 112b may be bent or otherwise formed into a curved configuration and welded or connected together in any suitable manner at seams 132 to form a cylindrical body. That cylindrical body may then be placed over an expandable hub that can be expanded (e.g., mechanically expanded) to engage the cylindrical body. With such a configuration, the cylindrical stamper plate body may be removed from the hub and replaced with a different cylindrical stamper plate body as needed.

The stamper plates 112a and 112b may also be oriented in any suitable manner so that the stamper plates 112a and 112b may be distinguished from each other based on imprints on the tape media made by the stamper plates 112a and 112b. In that regard, a tape drive in which the tape media is received may include a suitable optical reader or detector 133 (shown in FIG. 7), such as a wobble address decoder or index matched filter, that may read or otherwise detect information, such as an identifier, at the beginning and end of each imprinted portion of the tape media corresponding to the beginning and end, respectively, of a particular stamper plate 112a, 112b, and output a suitable signal or signals corresponding to the detected information. For example, the detector 133 may detect the shape of an index pulse or pulse identifier in a pre/post field of the imprinted tape media, and output a positive or a negative pulse signal (or a signal corresponding to a "1" or a "0" identifier, respectively) depending on the shape of the detected index pulse. That information may then be used to determine which stamper plate 112a, 112b was used to imprint the particular section of tape media.

Figure 7:
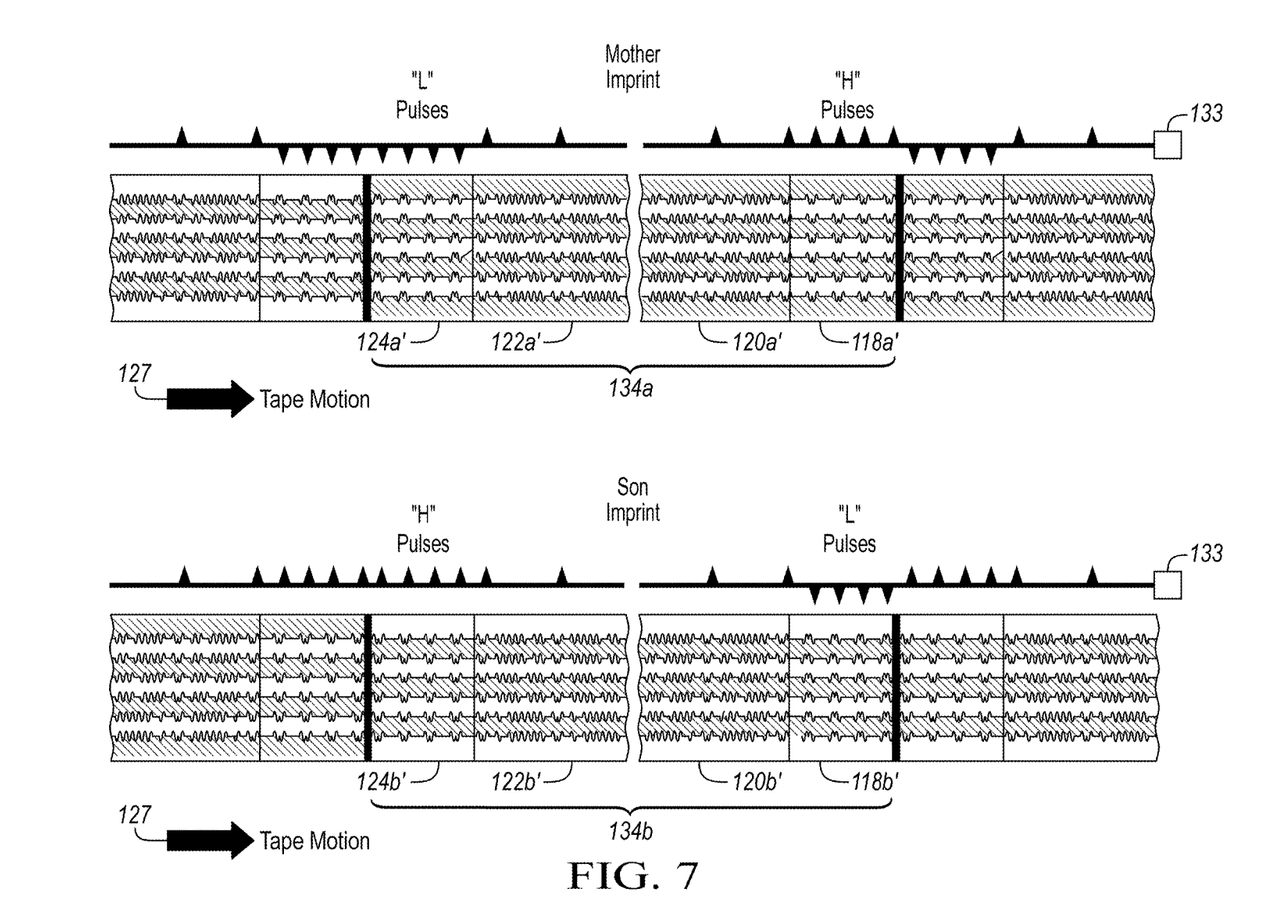
FIG. 7 is a plan view of first and second portions of tape media that have been imprinted by the first and second stamper plates, respectively.

Referring to FIG. 7, for example, a first portion 134a of tape media imprinted by one of the first stamper plates 112a is shown at the top portion of that Figure, and a second portion 134b of tape media imprinted by one of the second stamper plates 112b is shown at the bottom portion of that Figure. Each tape portion 134a, 134b is divided into tape sections that are identified with the same reference identifiers used to identify the corresponding stamper plate sections that were used to emboss the tape sections, except the reference identifiers for the tape sections each include a prime mark. Furthermore, the section orientation for each tape portion is vertically mirrored with respect to the corresponding stamper plate. For example, the rightmost section of the first tape media portion 134a is identified with reference identifier 118a', and the leftmost section of the first tape media portion 134a is identified with reference identifier 124a'. In the embodiment shown in FIG. 7, the rightmost section 118a', which corresponds to a post-seam field, defines a "high" or "positive" index pulse or pulse identifier, and the leftmost section 124a', which corresponds to a pre-seam field, defines a "low" or "negative" index pulse or pulse identifier. Likewise, the rightmost section 118b' (which corresponds to a post-seam field) of the second tape media portion 134b' defines a "low" or "negative" index pulse or pulse identifier, and the leftmost section 124b' (which corresponds to a pre-seam field) of the second tape media portion 134b' defines a "high" or "positive" index pulse or pulse identifier.

Figure 8:
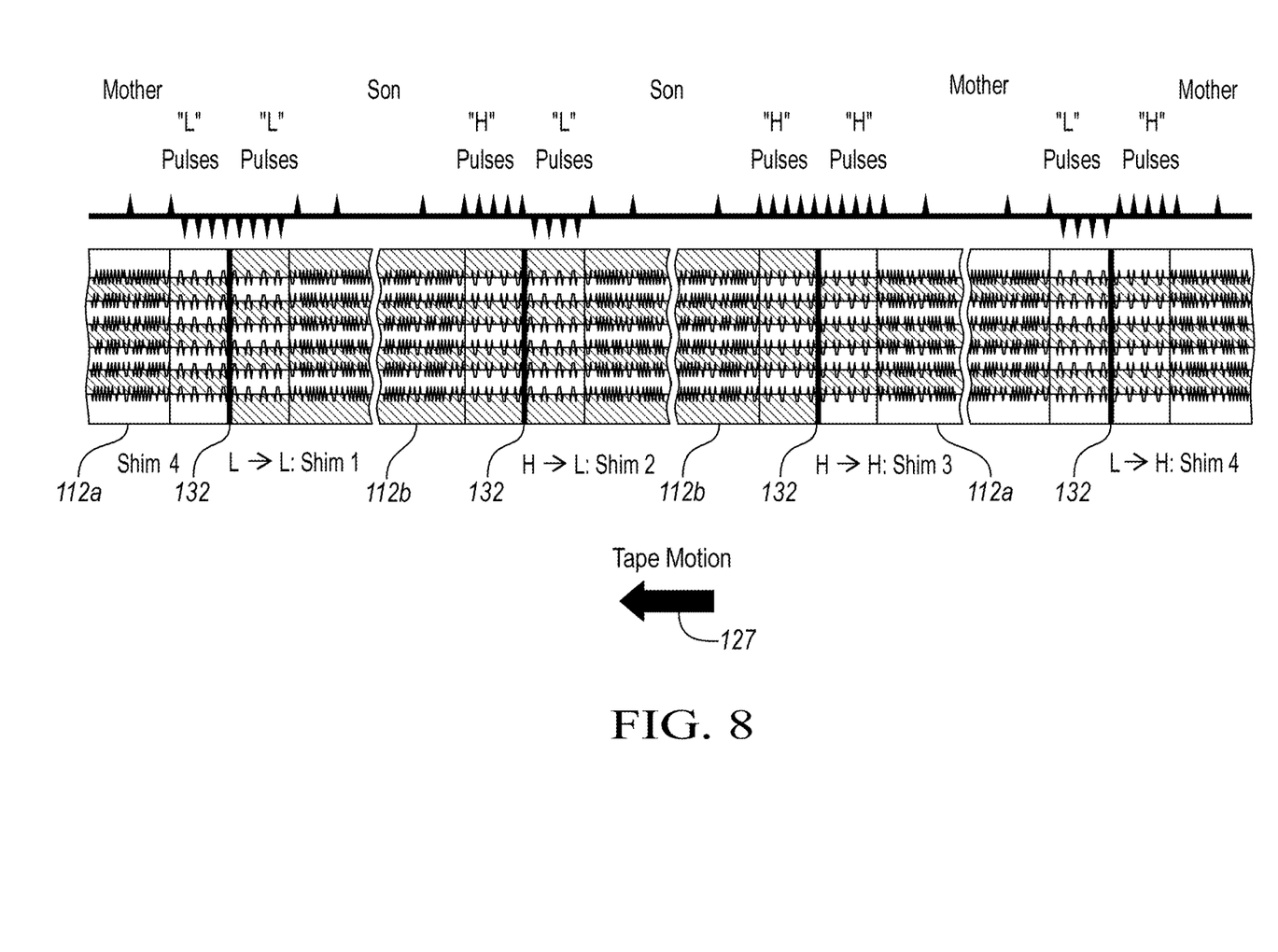
FIG. 8 is a plan view showing four stamper plates welded together for making the embossing drum shown in FIG. 3.

With the above configuration, two first stamper plates 112a and two second stamper plates 112b may be oriented in any suitable manner, such as shown in FIG. 8, so that the corresponding index pulses imprinted onto the tape media will enable identification of each particular stamper plate. In the embodiment shown in FIG. 8, for example, the stamper plates 112a, 112b are arranged in the following order: second stamper plate 112b (shim 1)—second stamper plate 112b (shim 2)—first stamper plate 112a (shim 3)—first stamper plate 112a (shim 4). The corresponding index pulse polarity associated with each end of each stamper plate 112a, 112b is also shown in FIG. 8.

That same index pulse polarity is imprinted onto the tape media during the embossing procedure. The index pulse polarity detected by the detector 133 in the drive during use of the tape media may then be used to determine which particular stamper plate 112a, 112b was used to imprint a particular portion of the tape media. For example, based on detected index pulse polarity or pulse identifiers at tape media locations corresponding to post- and pre-seam fields of the stamper plates, the particular stamper plate may be identified using the following table:

| Detected Index Pulse Polarity | Assigned Shim/Stamper Plate Identifier |
| --- | --- |
| L-L | Beginning of shim/stamper plate 1 |
| H-L | Beginning of shim/stamper plate 2 |
| H-H | Beginning of shim/stamper plate 3 |
| L-H | Beginning of shim/stamper plate 4 |

With the above arrangement, the embossing drum 110 having distinguishable or identifiable stamper plates or shims may be efficiently made using a single master template. Stamper plate or shim identification may be important for longitudinal addressing of the tape media, for example. Furthermore, with the above arrangement, portions of the imprinted tape media may be accurately correlated with particular sections of the embossing drum 110. As a result, defective stamper plates may be readily identified and/or formation of improved stamper plates for future use may be enabled.

An embossing drum according to the present disclosure may include any suitable number of stamper plates that may be formed using a single master template. For example, depending on desired size of a particular embossing drum, two or more stamper plates may be used to form the embossing drum. In one embodiment, an embossing drum according to the disclosure may be provided with eight stamper plates including four of the above described first stamper plates 112a and four second stamper plates 112b that are arranged in the following order, for example: second stamper plate 112b (shim 1)—second stamper plate 112b (shim 2)—first stamper plate 112a (shim 3)—first stamper plate 112a (shim 4)—second stamper plate 112b (shim 5)—second stamper plate 112b (shim 6)—first stamper plate 112a (shim 7)—first stamper plate 112a (shim 8). Based on detected index pulse polarity or pulse identifiers at tape media locations corresponding to post- and pre-seam fields of the stamper plates, the stamper plates may be identified using the following table, for example:

| Detected Index Pulse Polarity | Assigned Shim/Stamper Plate Identifier |
| --- | --- |
| L-L | Beginning of shim/stamper plate 1 |
| H-L | Beginning of shim/stamper plate 2 |
| H-H | Beginning of shim/stamper plate 3 |
| L-H | Beginning of shim/stamper plate 4 |
| L-L | Beginning of shim/stamper plate 5 |
| H-L | Beginning of shim/stamper plate 6 |
| H-H | Beginning of shim/stamper plate 7 |
| L-H | Beginning of shim/stamper plate 8 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making an embossing drum for embossing tape media, the method comprising:
assembling together multiple stamper plates into a stamper plate body, the multiple stamper plates including a first stamper plate and a second stamper plate, the assembling comprising coupling a first stamper plate having first land and groove patterns to a second stamper plate having second land and groove patterns that are an inverse of the first land and groove patterns, each of the first stamper plate and the second stamper plate having four sections arranged in a travel direction of the tape media, a first and a fourth of the four sections having land and groove patterns that are laterally mirrored with respect to each other.

2. The method of claim 1 wherein the multiple stamper plates include two of the first stamper plates and two of the second stamper plates.

3. The method of claim 2 further comprising coupling the two first stamper plates to each other and coupling the two second stamper plates to each other.

4. The method of claim 2 further comprising forming each first stamper plate using a single master template.

5. The method of claim 4 further comprising forming each first stamper plate using one or more intermediate replicas made from the single master template.

6. The method of claim 4 further comprising forming each second stamper plate using one of the first stamper plates or an additional first stamper plate made using the single master template.

7. The method of claim 2 wherein each of the multiple stamper plates includes an identifier at each end of the respective stamper plate, and wherein the assembling comprises arranging the multiple stamper plates such that the identifiers of adjacent ends of adjacent stamper plates are usable to identify each stamper plate.

8. The method of claim 1 wherein the assembling comprises welding the first stamper plate to the second stamper plate.

9. The method of claim 1 wherein the assembling comprises coupling together the multiple stamper plates to form a cylindrical stamper plate body.

10. The method of claim 1 wherein the land and groove patterns comprise wobble patterns, and wherein the assembling comprises arranging the multiple stamper plates such that the wobble pattern of the first stamper plate is vertically mirrored with respect to the wobble pattern of the second stamper plate.

11. The method of claim 1 wherein the first of the four sections have groove patterns with identically wobbled edges and the fourth of the four sections have land patterns with identically wobbled edges.

12. The method of claim 1 wherein the first of the four sections of the second stamper plate is laterally mirrored with respect to the first of the four sections of the first stamper plate and the fourth of the four sections of the second stamper plate is laterally mirrored with respect to the fourth of the four sections of the first stamper plate.

13. An embossing drum for embossing tape media, the embossing drum comprising:
a first stamper plate having first land and groove patterns for embossing the tape media; and
a second stamper plate having second land and groove patterns that are an inverse of the first land and groove patterns positioned proximate the first stamper plate for embossing the tape media, wherein each of the first stamper plate and the second stamper plate have four sections arranged in a travel direction of the tape media, a first and a fourth of the four sections having land and groove patterns that are laterally mirrored with respect to each other.

14. The embossing drum of claim 13 wherein the land and groove patterns comprise wobble patterns, and the wobble pattern of the first stamper plate is vertically mirrored with respect to the wobble pattern of the second stamper plate.

15. The embossing drum of claim 13 further comprising an additional first stamper plate having the same configuration as the first stamper plate, and an additional second stamper plate having the same configuration as the second stamper plate, wherein the stamper plates are attached together.

16. The embossing drum of claim 15 wherein the first stamper plates are positioned adjacent to each other, and the second stamper plates are positioned adjacent to each other.

17. The embossing drum of claim 15 wherein the land and groove patterns define embossing features, and the embossing features of each stamper plate of the first and second stamper plates include an identifier at each end of each stamper plate, and wherein the identifiers of adjacent ends of adjacent stamper plates are usable to identify each stamper plate.

18. The embossing drum of claim 13 wherein the first of the four sections have groove patterns with identically wobbled edges and the fourth of the four sections have land patterns with identically wobbled edges.

19. The embossing drum of claim 13 wherein the first of the four sections of the second stamper plate is laterally mirrored with respect to the first of the four sections of the first stamper plate and the fourth of the four sections of the second stamper plate is laterally mirrored with respect to the fourth of the four sections of the first stamper plate.

20. The embossing drum of claim 13 wherein the first stamper plate and the second stamper plate are coupled together to form a cylindrical stamper plate body.

* * * * *